(12) United States Patent
Lin et al.

(10) Patent No.: US 7,855,339 B2
(45) Date of Patent: Dec. 21, 2010

(54) ELECTRICAL JUNCTION BOX COVER SYSTEM FOR USE NEAR WATER

(75) Inventors: David Y. Lin, Castro Valley, CA (US); Roger F. Buelow, Gates Mills, OH (US)

(73) Assignee: Energy Focus, Inc., Solon, OH (US)

( * ) Notice: Subject to any disclaimer, the term of this patent is extended or adjusted under 35 U.S.C. 154(b) by 300 days.

(21) Appl. No.: 12/238,665

(22) Filed: Sep. 26, 2008

(65) Prior Publication Data

US 2009/0078442 A1    Mar. 26, 2009

Related U.S. Application Data

(60) Provisional application No. 60/975,370, filed on Sep. 26, 2007.

(51) Int. Cl.
 *H05K 5/06* (2006.01)
(52) U.S. Cl. .............. 174/50.51; 174/50; 174/50.5; 439/535; 248/906
(58) Field of Classification Search .......... 174/50, 174/50.51, 50.5, 520; 220/4.02; 439/535; 248/906

See application file for complete search history.

(56) References Cited

U.S. PATENT DOCUMENTS

| | | | |
|---|---|---|---|
| D214,449 S | 6/1969 | Greene | |
| 5,382,752 A | 1/1995 | Reyhan et al. | |
| 5,541,363 A | 7/1996 | Weise et al. | |
| 5,670,745 A * | 9/1997 | Yajima et al. | 174/50.5 |
| 5,736,675 A * | 4/1998 | Michaels | 174/50.5 |
| 5,988,838 A | 11/1999 | Rudenberg | |
| 5,999,072 A | 12/1999 | Slavik | |
| 6,252,164 B1 * | 6/2001 | Wise | 174/50 |
| 6,394,630 B1 | 5/2002 | Skidmore et al. | |
| 6,550,932 B2 | 4/2003 | Poon | |
| 6,586,674 B2 * | 7/2003 | Krause et al. | 174/50.5 |
| 6,949,894 B1 | 9/2005 | Sullivan et al. | |
| 6,971,760 B2 | 12/2005 | Archer et al. | |
| 6,971,888 B2 | 12/2005 | Takuchi et al. | |
| 6,984,944 B2 | 1/2006 | Garrity | |
| 7,053,298 B2 * | 5/2006 | Ikeda et al. | 174/50 |
| 7,164,364 B2 | 1/2007 | Ares Losada | |
| 7,179,990 B2 | 2/2007 | Kanazawa | |
| 7,253,356 B2 | 8/2007 | Kiyota et al. | |
| 7,282,641 B2 * | 10/2007 | Ueno | 174/50.51 |
| 7,286,904 B2 | 10/2007 | Graham | |
| 2007/0144779 A1 | 6/2007 | Vicente et al. | |
| 2007/0236921 A1 | 10/2007 | Mosholder, Jr. et al. | |

* cited by examiner

*Primary Examiner*—Dhiru R Patel
(74) *Attorney, Agent, or Firm*—Bruzga & Associates; Charles E. Bruzga

(57) ABSTRACT

An electrical junction box cover system includes a waterproof dome-like covering lid allowing the system to be installed near water. The system also includes a manual power switch with a manual actuator installed on the outside of the covering lid and accessible to the user. The switch actuator has three positions, wherein the actuator in the first position turns an external load circuit on, in the second position it turns the external circuit off, and in the third position it enables the remotely controlled operation of the external circuit. A remote control receiver with an electronic control module and an electric power switch are included in the system as an assembly in order to allow a remotely controlled operation of the system.

7 Claims, 7 Drawing Sheets

ELECTRICAL JUNCTION BOX COVER SYSTEM FOR USE NEAR WATER

This application claims priority from U.S. Provisional Patent Application No. 60/975,370 filed Sep. 26, 2007.

FIELD OF THE INVENTION

The present invention relates to electrical junction boxes and in particular to an electrical junction box cover system allowing a remotely controlled or manual operation of an electrical load circuit (e.g., lighting) near water, such as in the immediate vicinity of open bodies of water or in environments subject to moisture.

BACKGROUND OF THE INVENTION

Electric lighting is required for the majority of our everyday activities and finding a convenient and easy way of controlling the lighting was always an issue. Many recreational and industrial activities involve installation of the lighting controls in the immediate vicinity of open bodies of water or in environments subject to moisture, such as swimming pools, fountains, spas, greenhouses, carwashes, backyards, etc.

A swimming pool lighting control system is discussed as an exemplary application of the present invention. The wiring infrastructure of a swimming pool and particularly its lighting system is typically constructed using a well-established method. An electrical circuit breaker box is situated in a nearby building or equipment shed at some distance from the swimming pool, where the equipment is not easily accessible to the pool users. The circuit breaker box feeds electrical switches by which the pool lighting system can be controlled. From the circuit breaker box electrical wires are routed to the swimming pool area in electrical conduits. The conduits are typically made of metal or PVC plastic. Near the swimming pool, there is located an electrical junction box where an electrician may connect the incoming wires to the lamps' own wiring. These junction boxes are present so that lighting systems may be periodically replaced without rerouting all the wiring, or because of local electrical code requirements. Standard junction boxes are not designed for use near water, so special water-tight electrical junction boxes have become established for this purpose, such as described in U.S. Pat. No. 5,382,752 to Reyhan et al. and U.S. Pat. No. 5,541,363 to Weise et al.

Water-tight electrical junction boxes are typically designed to allow an electrician easy access during construction and then to keep the wiring junctions dry internally and to provide a safe environment near the electrical power for the users. These junction boxes have been made in a variety of forms, materials, and sizes but they have not provided an end-user of the system with direct on-site lighting control means.

There are many commercial systems in existence for operating swimming pool lighting from the vicinity of the pool area. For a number of reasons, such as safety regulations and convenience of having all the operating controls of the pool equipment at one location, these systems are often of the remote-controlled variety, wherein the user carries a hand-held remote-control device and the remote-control receiver connected with a lighting control module of the circuit breaker box is located in the equipment shed. However, in such a situation where the lighting control module is removed from the user's location at the pool area, if the remote control fails or there is signal interference, the pool user must travel away from the pool to the equipment shed to identify the problem and perform manual switching operations.

If manual switches for lighting control are desired in the vicinity of the poor, they must be of a waterproof nature, e.g. a weatherproof switch described in U.S. Pat. No. 5,999,072 to Slavik. However, such switches are typically bulky, having the size comparable to the size of a junction box, and are more expensive than standard user switches. Besides, an installation of such a weatherproof manual switch in the vicinity of the pool would require additional labor and expenses such as providing additional wiring infrastructure connecting the switch with a junction box, and building a foundation for the switch.

Accordingly, there is a need for an easily installable, safe arrangement facilitating manual control of lighting from the immediate vicinity of the users location without loss of the advantages of a remote control of lighting existing in prior art systems.

SUMMARY OF THE INVENTION

A preferred embodiment of the invention comprises an electrical junction box cover system capable of being safely used in a wet environment without submersion under water. The system includes a covering lid having a looped side wall with first and second ends and a cover portion at the first end of the looped side wall. The looped side wall and the cover portion form a dome-like enclosure with an opening at the second end of the looped side wall. The second end of the looped side wall further comprises a coupling flange configured to directly or indirectly couple the covering lid to a base plate in a removable and hermetic manner. The covering lid is made of a waterproof material and is capable of being hermetically coupled to the base plate, wherein water reaching the covering lid is prevented from reaching electrical circuitry inside the enclosure through the covering lid. A remote control receiver is mounted inside the covering lid. The system further includes an electronic control module for controlling an electrical on-off power switch for an external load circuit. The electronic control module is mounted inside the covering lid and is responsive to the remote control receiver. A manual power switch has a manually accessible switch actuator located on the outside of the covering lid. The switch actuator has first, second and third actuator positions. The first actuator position corresponds to closing a circuit to supply power to the external load circuit. The second actuator position corresponds to opening a circuit to cut off power to the external load circuit. The third actuator position enables the electrical on-off power switch to operate the external load circuit.

The foregoing system allows a user of a swimming pool, for instance, to control an electrical load circuit, such as swimming pool lighting, by a manual switch or with a remote control device from the immediate vicinity of the pool area. The availability of such a system relieves the user of a burden of traveling to a distant lighting control module to operate the lighting manually when the remote control option is lacking or has failed. The system provides the foregoing benefit without requiring substantial additional wiring infrastructure, and it inter-operates with all existing pool lighting controls of either the manual or the remote-control variety. The foregoing system can accomplish these benefits in a way consistent with typical United States electrical codes and safety regulations.

The aforementioned electrical junction box cover system may be used in a number of indoor or outdoor settings requiring control of an electrical load circuits, e.g. lighting, from the immediate vicinity of the user's location. Since the system is of a watertight type, it may be used safely near open bodies of water or in wet environments, such as swimming pools, fountains, spas, carwashes, backyards, etc.

DETAILED DESCRIPTION OF THE INVENTION

The following detailed description will proceed with reference to a particular illustrated embodiment. However, the embodiment shown on the drawings is presented only as an example of the claimed subject matter, and should be considered not as limiting the scope of the invention, but covering all the variations and modifications obvious to a person of ordinary skill in the art.

The claimed subject matter relates to a novel junction box cover system with integrated control features allowing manual or remotely controlled operation of an electrical load circuit (e.g., lighting system) near water in an outdoor or indoor setting.

Figure 1:
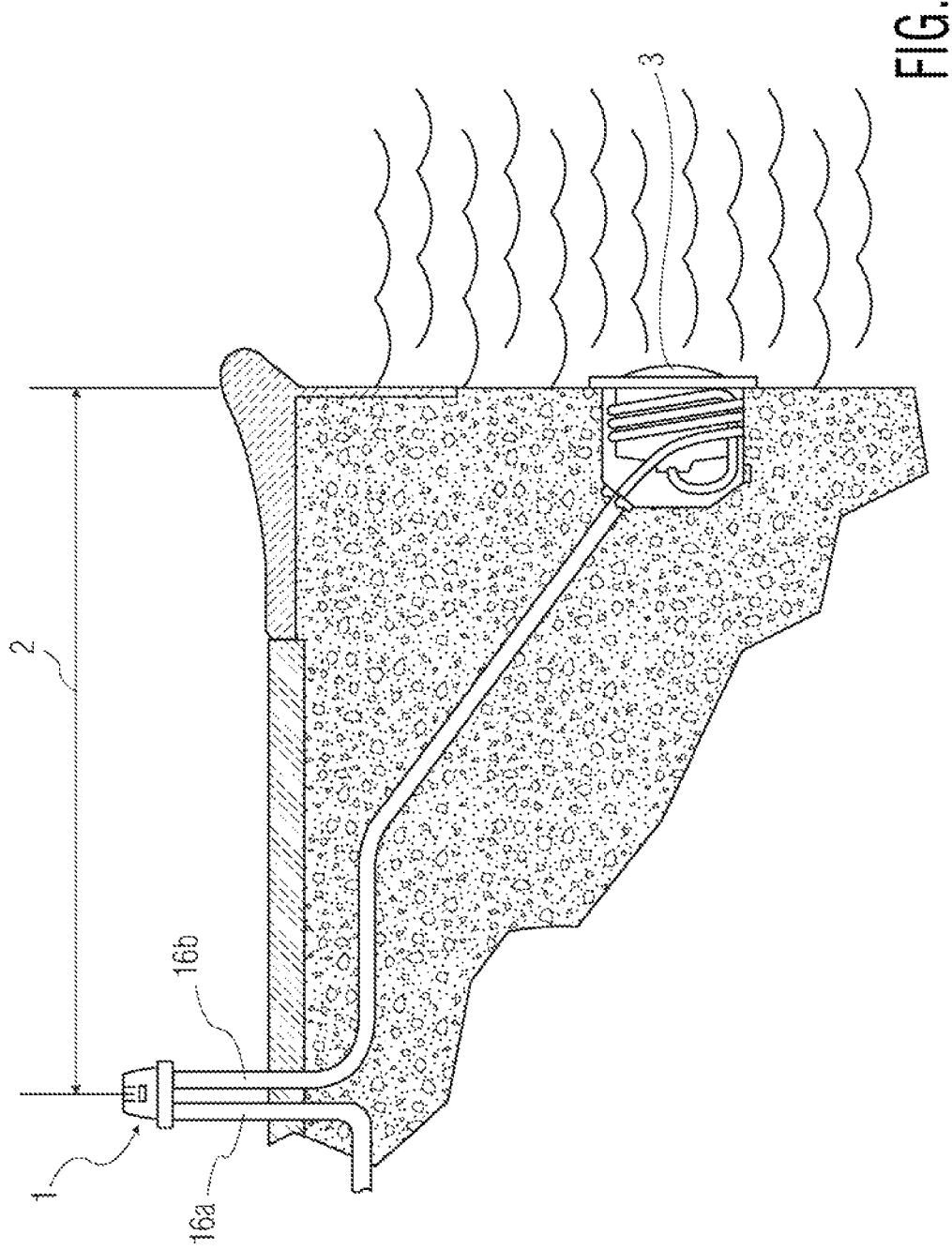
FIG. 1 is a simplified view, partially in cross section, of a typical installation of an electrical junction box with a manual switch and a remote control receiver in accordance with a preferred embodiment of the invention.

FIG. 1 shows a typical installation of an electrical junction box with the claimed cover system 1 including a manual electrical lighting switch near a swimming pool. Typically, distance 2 (48 inches or 120 cm) of the cover system from the wall of the swimming pool is the minimal permissible spatial distance according to United States electrical safety regulations. The junction box is supported by upright (i.e., substantially vertical) rigid conduits 16a and 16b routing electrical cables in and out of the junction box. The electrical power is provided to the junction box from an external power supply line through the Power In cable. From the junction box the power is fed directly to the swimming pool light(s) 3 for instance. Due to the placement of the lighting controls in the junction box located near the swimming pool the user can manually switch the lights without going to a distant circuit breaker box (not shown).

Figure 2:
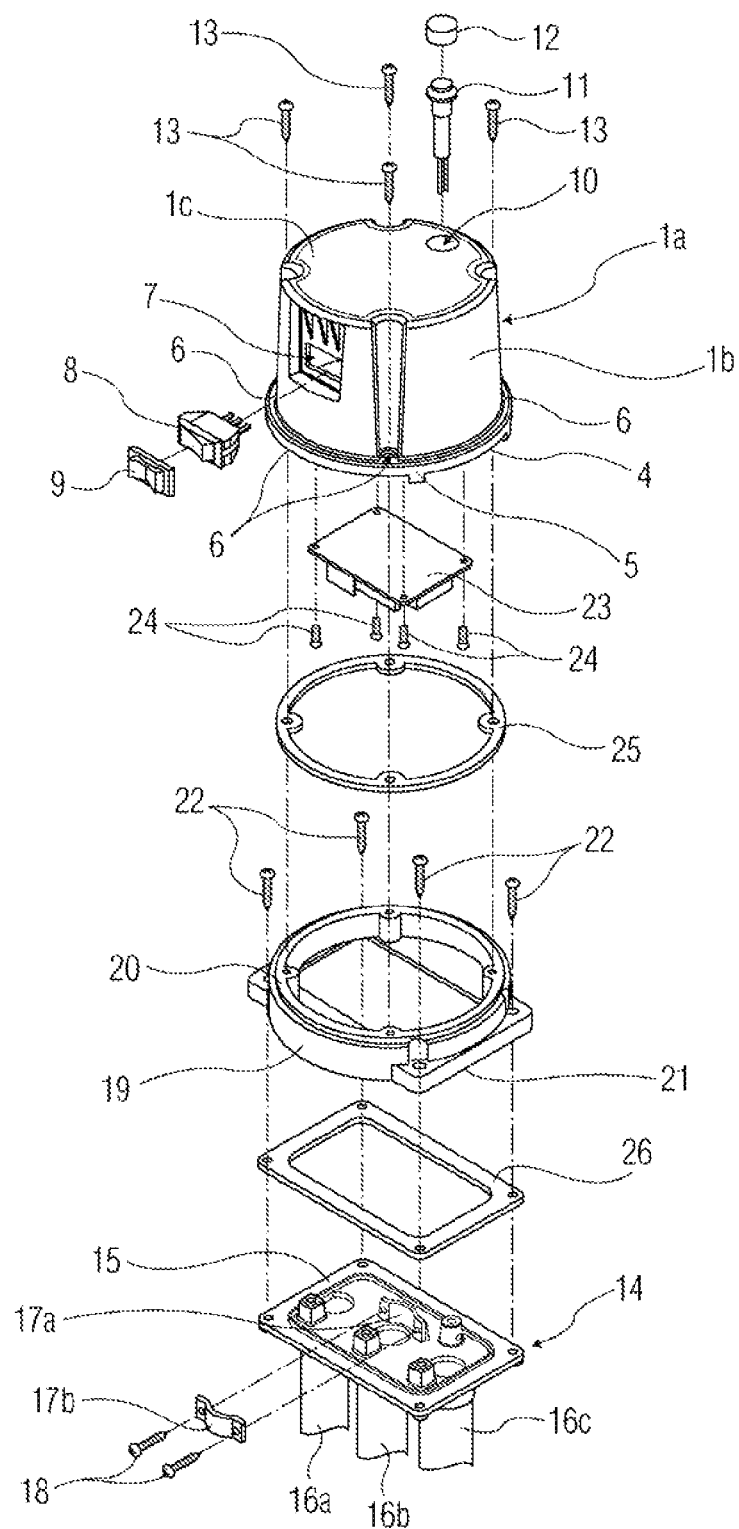
FIG. 2 is an exploded view of an electrical junction box cover system for use in the installation of FIG. 1.

Referring to FIG. 2, a preferred embodiment of the claimed cover system comprises a covering lid 1a including a looped side wall 1b and a cover portion 1c. The covering lid 1a forms a dome-like enclosure with an opening at the bottom portion 4 of the side wall 1b. Typically the covering lid 1a is made of a waterproof material, such as polymer, plastic, or metal. Around the bottom portion 4 there is a coupling flange 5 provided for coupling the covering lid to an optional base adapter 19, which further mounts on to the base plate 14. In the preferred embodiment the covering lid 1a is attached to the base adapter 19 by screws 13 passing through corresponding holes 6 situated around the perimeter of the coupling flange 5. The base adapter 19 is in turn mounted on to the base plate 14 by screws 22. This type of connection is not essential for the operation of the system and in other embodiments the covering lid may be attached to the base adapter and further to the base plate by clamps, clips or other fasteners instead of screws.

The base plate 14 is typically supported by upright (i.e., substantially vertical) rigid conduits 16a, 16b, and 16c. The conduits 16a-16c route electrical cables in and out of the junction box. The electrical cables are held by the cable clamps 17a and 17b. Cable clamp 17a is mounted on the base plate 14, and the cable clamp 17b is coupled to cable clamp 17a by screws 18, thereby clutching the electrical cables in between cable clamps 17a and 17b.

Figure 3A:
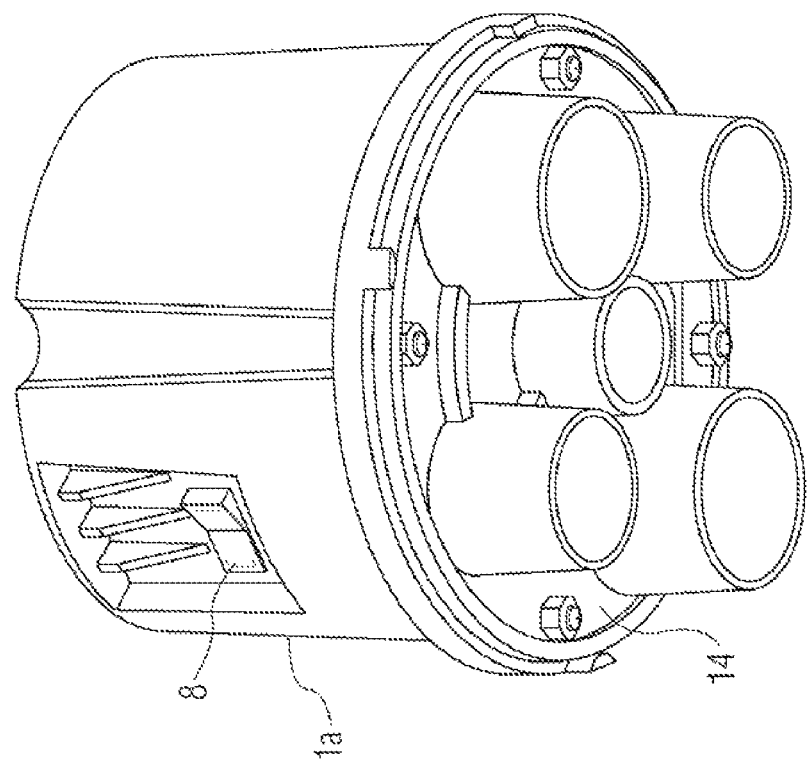
FIG. 3A is a perspective view of a conventional junction box base plates retrofitted with the presently claimed junction box cover system including the base adapter.
Figure 3B:
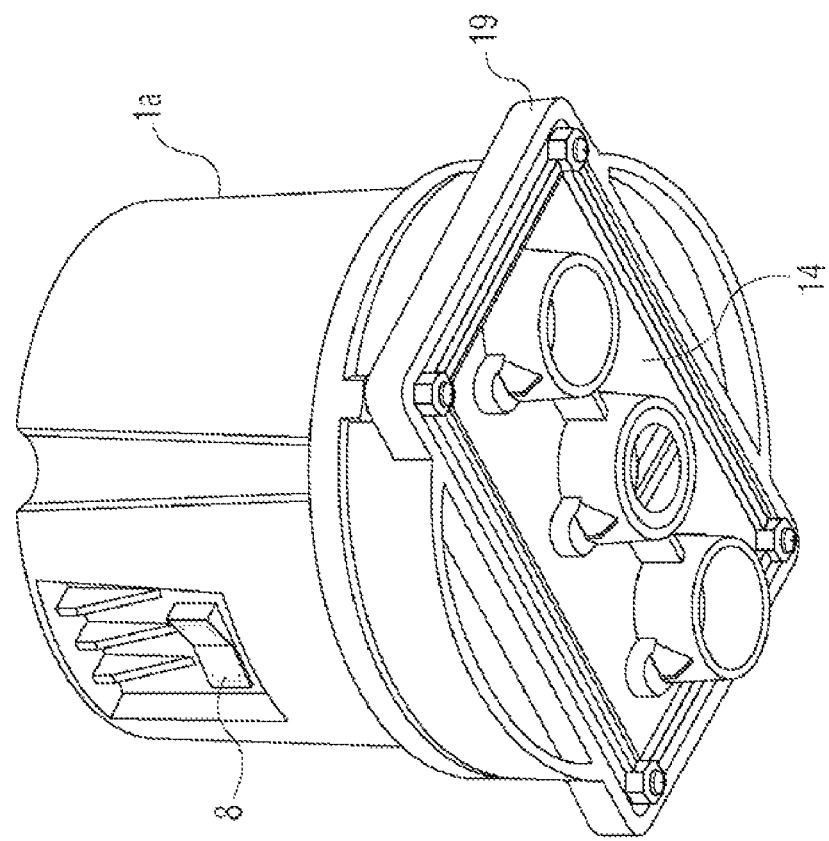
FIG. 3B is a perspective view of a conventional junction box base plate retrofitted with the presently claimed junction box cover system without the base adapter.

Means to mount the lower end of the looped side wall 1b, which has a coupling flange 5, to the base plate 14 in a fixed, hermetically sealed and removable manner may include the base adapter 19, gaskets 25 and 26, and screws 13 and 22. The base adapter 19 has two mating portions 20 and 21. The top mating portion 20 is compatible with the coupling flange 5 of the covering lid 1a, while the bottom mating portion 21 is compatible with the mounting structure 15 of the base plate 14. Gasket 25 may be used to provide a hermetic connection between the coupling flange 5 of the covering lid 1a and the base adapter 19. Gasket 26 may be used to provide a hermetic connection between the base adapter 19 and base plate 14. The adapter's mating portion 21 may be varied in shape to enable the covering lid 1a to be mounted to one of a number of established pre-installed base plates which support the covering lid 1a. The pre-installed base plates commonly are generally round, square or rectangular in shape. Such an arrangement including a base adapter 19 allows the use of the claimed junction box covering system as an upgrade for existing pre-installed junction boxes, where the coupling flange 5 of the covering lid 1a is incompatible with the mounting structure 15 of the base plate 14. Thus, there is no need to re-design the whole system in order to fit it on a particular base plate, and the covering system may be mounted on any pre-installed base plate by using an appropriate adapter 19 with the bottom mating portion 21 being compatible with the mounting structure 15 of the pre-installed base plate 14. FIGS. 3A and 3B show two types of conventional junction box base plates 14 with the claimed covering system 1 of FIG. 1 installed on them, wherein FIG. 3A shows an installation with the base adapter 19, and FIG. 3B shows an installation without the base adapter 19. Accordingly, in the FIG. 3B embodiment, the means to mount the lower end of the looped side wall 1b, which has a coupling flange 5, to the base plate 14 in a fixed, hermetically sealed and removable manner does not require the base adapter 19. Such means to mount may include the four unnumbered mounting screws and nuts shown in FIG. 3B and appropriate hermetic sealing means such as gasket 25 (FIG. 2).

Although not shown in the drawings, a proprietary base plate may be sold with the claimed system in case of a new installation. The availability of such a proprietary base plate having a mounting structure 15 compatible with the coupling flange 5 of the covering lid 1a eliminates the need of a base adapter 19.

Figure 4:
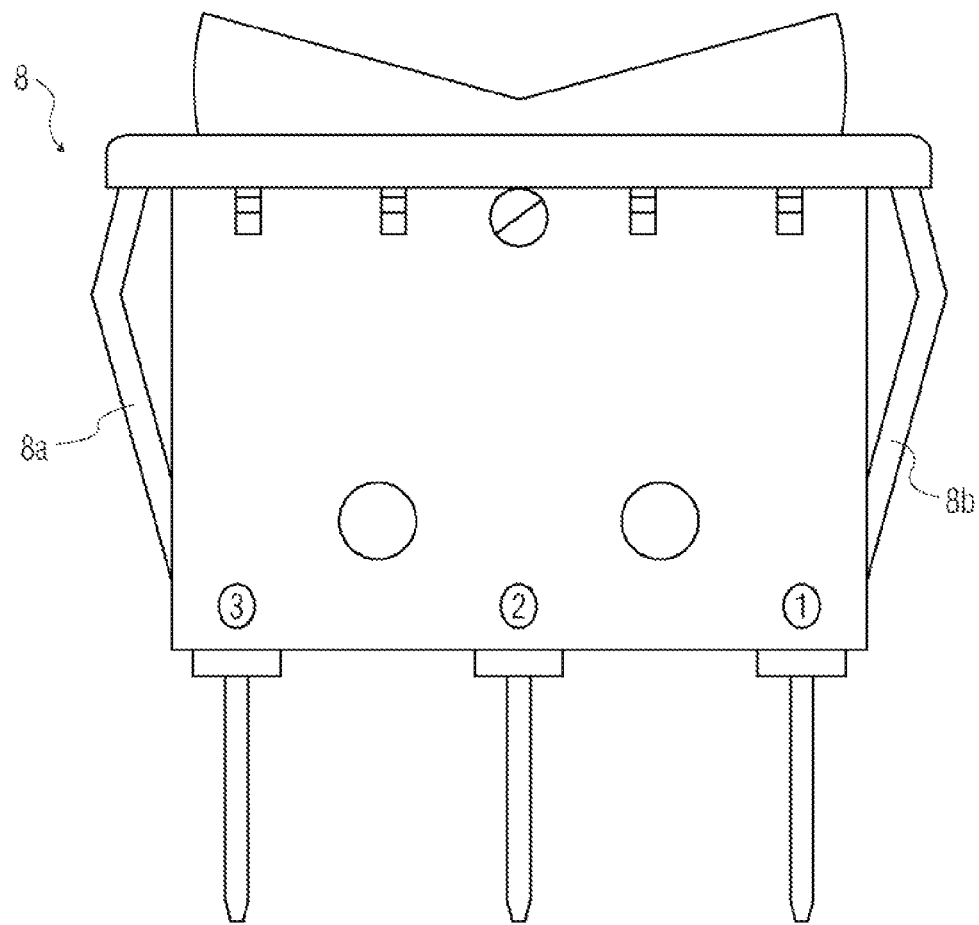
FIG. 4 is a side view of a 3-position manual rocker switch for use in the installation of FIG. 1.

Referring back to FIG. 2, the side wall 1b of the covering lid 1a has an opening 7 for mounting the manual electrical switch 8. The manual switch 8 is covered with a sealing boot 9 made of silicone, rubber or other material capable of providing a water-tight seal around the opening 7. The manual switch 8 in the preferred embodiment is a 3-position rocker switch. This 3-position switch allows manual operation and enables remote operation of the swimming pool lights. FIG. 4 shows a side view of the 3-position rocker switch 8 used in the preferred embodiment. The switch 8 has springs or spring clips 8a and 8b on the side. The springs or spring clips 8a and 8b help to secure the switch into the cover lid 1a. The switch is pushed through a square hole in the cover lid as shown in FIG. 2. The spring or the spring clips 8a and 8b compress against the body of the cover lid and then once through the hole, they open up and hold the switch in place against the cover lid. A toggle switch or some other appropriate type of an electrical switch known to a person of ordinary skill in the art may be used in other embodiments as an alternative to the rocker switch.

Figure 5:
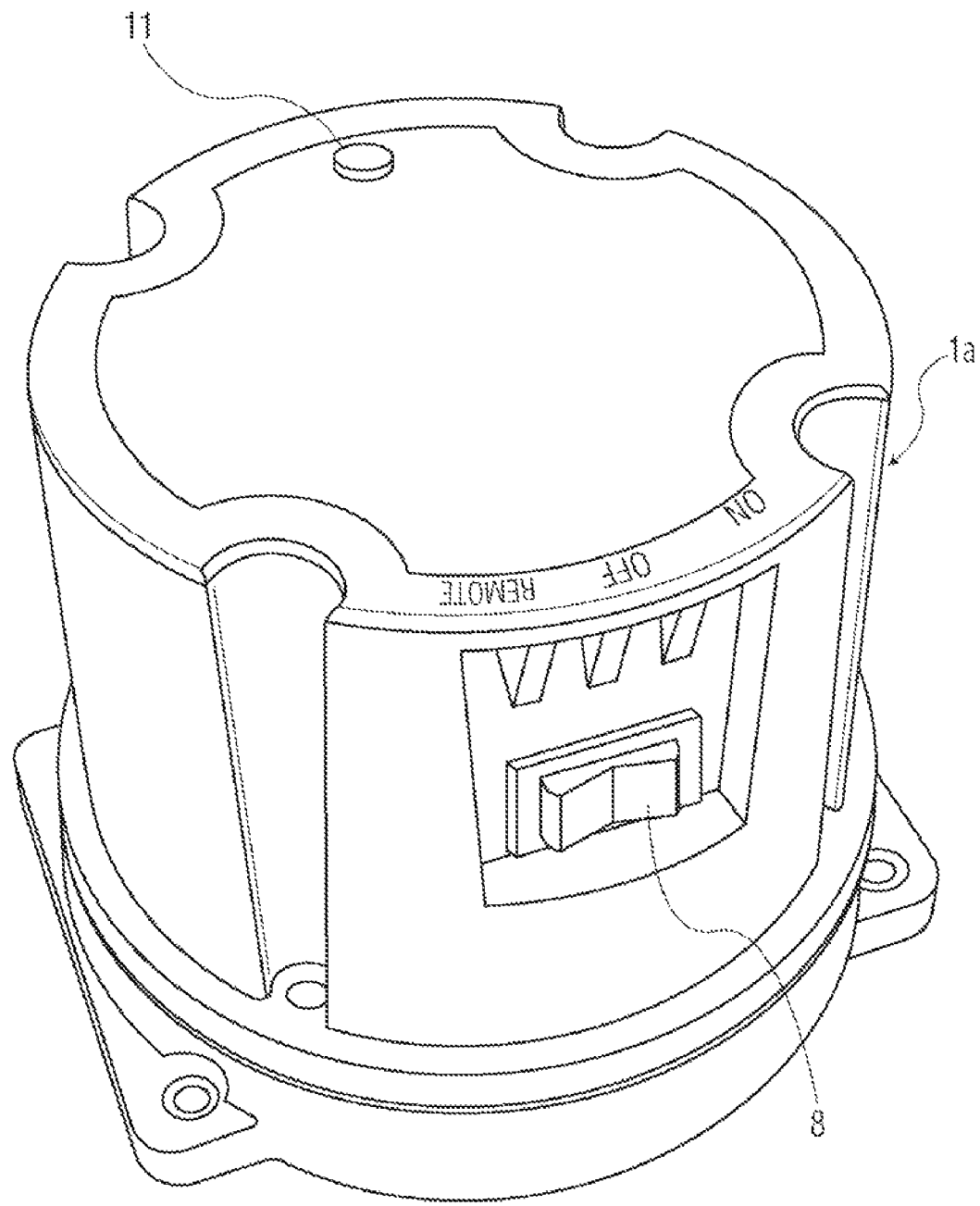
FIG. 5 is a perspective view of the junction box cover system with a rocker switch and an indicator light.

Referring back to FIG. 2, the cover portion 1c of the covering lid 1a comprises an opening 10 for an indicator light 11 which is covered with a sealing lens 12. The indicator light 11 is electrically connected in parallel to the wires feeding the swimming pool lights. This feature has multiple benefits. For instance, it allows the pool user to quickly determine that the pool lighting circuits are energized. If the lights do not work under these conditions, an immediate diagnosis may be made that one or more of the lights require maintenance. A perspective view of the cover system including the rocker switch 8 and an indicator light 11 is shown in FIG. 5.

Without the foregoing feature, the pool user would be required to travel to the control panel and verify the condition of the circuits as either energized or not and to perform other troubleshooting on the lighting system. Additionally, if there are multiple switch locations (for example one in a pool equipment shed and one in the main residence) the pool user would then have to travel to all such control locations to determine whether the lighting circuits are energized or not.

Figure 6:
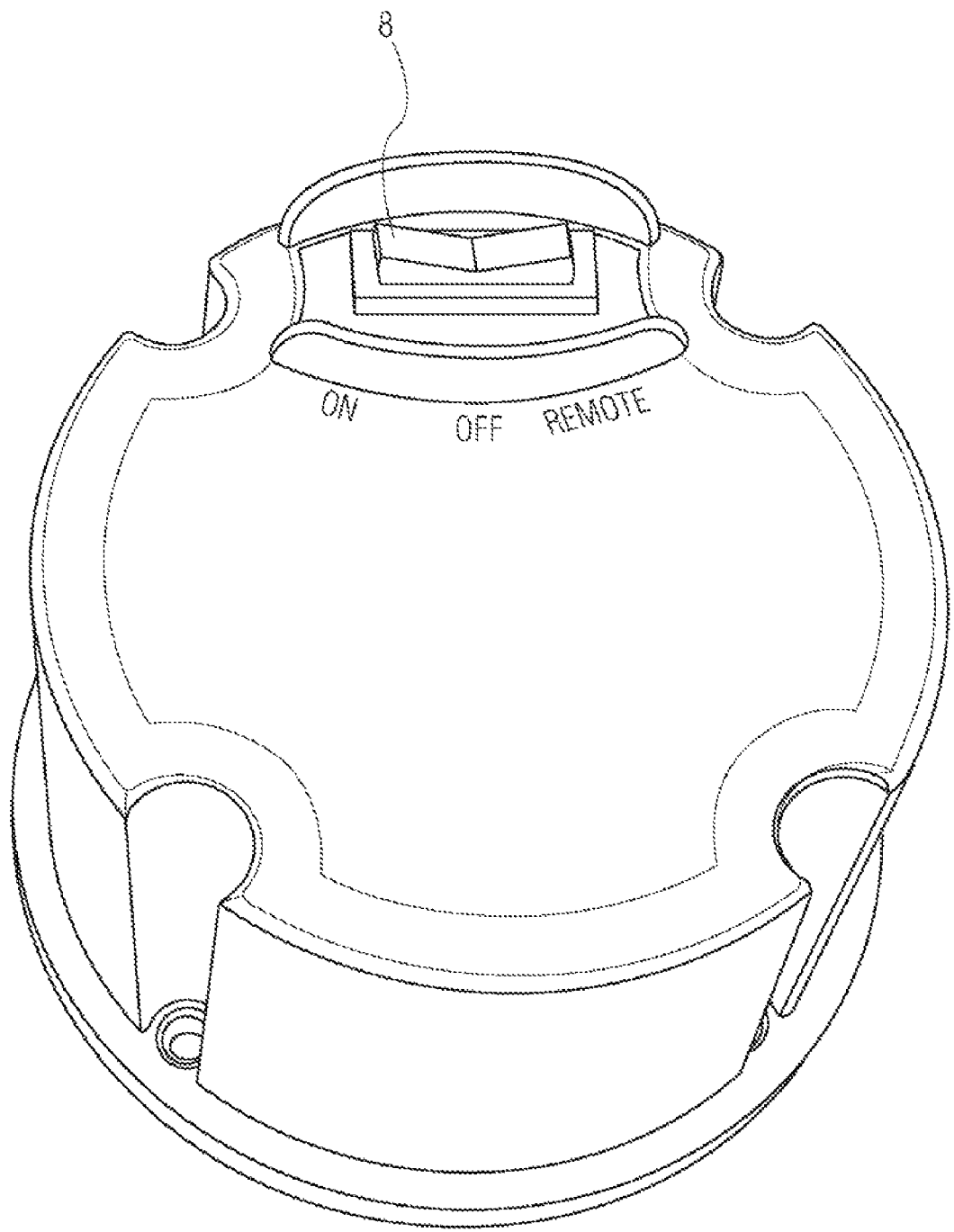
FIG. 6 is a perspective view of an alternative embodiment of the junction box cover system with a lighted rocker switch.

In another embodiment the functions of the indicator light 11 and the electrical switch 8 may be combined by way of using a lighted switch, such as shown on FIG. 6. Thus, such lighted switch may be used for manual and enable remote operation of the pool lighting. The integrated indicator light with the switch allows a user to determine whether the lighting circuits are energized, and it also may be used for a convenience of locating the switch in the dark.

The manually operated switch 8 shown in all these embodiments has three positions as shown in FIG. 6: ON, OFF and REMOTE. In the "ON" position, the pool lighting is turned on. In the "OFF" position, the lighting is turned off. In the "REMOTE" position, the lighting may be controlled by a handheld wireless remote control device (not shown). A receiver for the handheld remote control is incorporated into a Printed Circuit Board (PCB) Assembly 23, shown in block form in FIG. 7, which is configured to be mounted inside the covering lid 1a by screws 24 (FIG. 2). Thus, there is no additional wiring required to operate the lighting by remote control. The remote control device may use infrared rays, radiofrequency, sound or other available technologies for sending a signal to the receiver.

Figure 7:
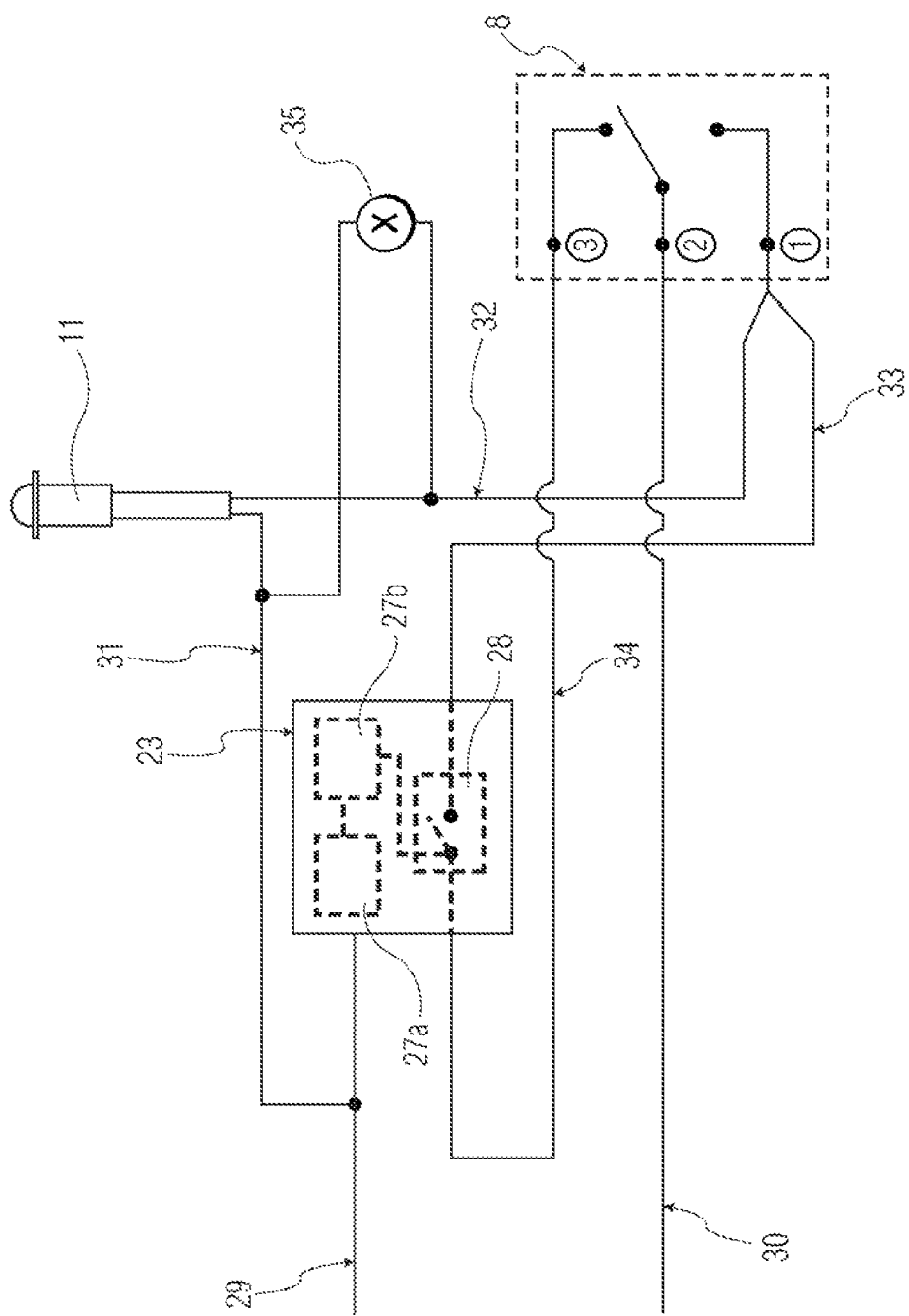
FIG. 7 is a schematic circuit diagram of a junction box cover system for use in the installation of FIG. 1.

FIG. 7 shows an exemplary circuit diagram for the claimed junction box cover system. The PCB assembly 23 comprises a Remote Control Receiver 27a, an Electronic Control Module 27b, and a Power Switching Device 28, such as an electromagnetic relay or its electronic equivalent. The electronic control module 27b responds to electronic commands issued by the remote control receiver 27a and operates the power switching device 28 accordingly, thereby allowing the user to operate the swimming pool lighting by using a handheld remote control device (not shown).

Referring to FIG. 7, the electric power is fed to the system through wires 29 and 30, wherein the wire 29 is connected directly to the indicator lamp 11 and a swimming pool light 35 by the wire 31. When the electrical switch 8 is in "OFF" position, none of its terminals (1), (2), and (3) is connected to one another. When the user sets the switch 8 in the "ON" position, the terminals (1) and (2) are connected together so as to form a closed circuit from wire 30 to terminal (2) of the switch 8, and from there through terminal (1) and wire 32 to the indicator lamp 11 and to the swimming pool light 35.

If remote controlled operation of the pool lighting is desired, the user may set the electrical switch 8 in "REMOTE" position, thereby connecting together terminals (2) and (3) of the electrical switch 8. In this situation an electric circuit is completed from wire 30 through terminals (2), (3), and wire 34 into the PCS Assembly 23. If at this point the remote control receiver 27 receives an "ON" signal, the remote control receiver 27 closes the relay 28 and forms a closed circuit from wire 30, through terminals (2) and (3) into wire 34, then through the closed relay 28 and wire 33 into wire 32 to the indicator lamp 11 and to the swimming pool light 35.

The claimed electrical junction box cover system may be sold as a kit for a completely new installation, wherein the kit will include a proprietary base plate. Alternatively, as described above, the system may be sold as an upgrade kit for preexisting junction boxes wherein the kit will comprise the covering lid with the included switching equipment and an appropriate base adapter to be mounted on a preinstalled base plate.

The use of the proposed electrical junction box cover systems is not limited to swimming pool lighting controls. Such systems may be used in any indoor or outdoor settings subject to heightened humidity, moisture or wet weather conditions, such as controlling the lighting or other electrical equipment of fountains, spas, greenhouses, carwashes, backyards, etc.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. An electrical junction box cover system capable of being safely used in a wet environment without submersion under water, comprising:
   a. a covering lid having a looped side wall with first and second ends and a cover portion at the first end of the looped side wall; said looped side wall and said cover portion forming a dome-like enclosure with an opening at the second end of the looped side wall;
   b. means to mount the second end of the looped side wall to a base plate in a fixed, hermetically sealed and removable manner; said second end comprising a coupling flange with a plurality of mounting apertures;
   c. said covering lid being made of a waterproof material, wherein water reaching the covering lid is prevented from reaching electrical circuitry inside the enclosure through the covering lid;
   d. a remote control receiver mounted inside the covering lid;
   e. an electronic control module for controlling an electrical on-off power switch for an external load circuit, said electronic control module being mounted inside the covering lid and being responsive to the remote control receiver; and f. a manual power switch having a manually accessible switch actuator located on the outside of the covering lid; said switch actuator having first, second and third actuator positions; the first actuator position corresponding to closing a circuit to supply power to the external load circuit; the second actuator position corresponding to opening a circuit to cut off power to the external load circuit; and the third actuator position enabling the electrical on-off power switch to remotely operate the external load circuit.

2. The electrical junction box cover system of claim 1, wherein the base plate has a mounting structure that does not significantly differ from planar.

3. The electrical junction box cover system of claim 1, wherein the base plate is fully supported by at least one conduit routing electrical wires into the box.

4. The electrical junction box cover system of claim 3, wherein the at least one conduit is upright.

5. The electrical junction box cover system of claim 1, wherein the means to mount the second end of the looped side wall to the base plate in a fixed, hermetically sealed and removable manner comprises a base adapter member having a closed-loop structure, a top mating portion configured to couple to the second end of the loop side wall of the covering lid, and a bottom mating portion configured to be mounted on the base plate.

6. The electrical junction box cover system of claim 1, wherein the waterproof material of the covering lid is metal or polymer.

7. The electrical junction box cover system of claim 1, further comprising a visual indicator light configured to indicate the presence of electric current in the external load circuit and configured to be mounted on the outside of the covering lid.

* * * * *